United States Patent
Grudzien

(10) Patent No.: US 7,204,150 B2
(45) Date of Patent: Apr. 17, 2007

(54) TURBO SUMP FOR USE WITH CAPACITIVE PRESSURE SENSOR

(75) Inventor: Chris P. Grudzien, Haverhill, MA (US)

(73) Assignee: MKS Instruments, Inc., Wilmington, MA (US)

( * ) Notice: Subject to any disclaimer, the term of this patent is extended or adjusted under 35 U.S.C. 154(b) by 13 days.

(21) Appl. No.: 11/036,775

(22) Filed: Jan. 14, 2005

(65) Prior Publication Data

US 2006/0156824 A1    Jul. 20, 2006

(51) Int. Cl.
  *G01L 9/12*  (2006.01)
  *G01L 8/08*  (2006.01)
(52) U.S. Cl. .................................................. 73/718
(58) Field of Classification Search .. 361/283.1–283.4; 73/718.724, 715–718
  See application file for complete search history.

(56) References Cited

U.S. PATENT DOCUMENTS

| 1,619,444 | A | 3/1927 | Taylor |
| 2,416,557 | A | 2/1947 | Wiener |
| 2,751,530 | A | 6/1956 | Armstrong |
| 2,753,515 | A | 7/1956 | Rickner |
| 2,755,419 | A | 7/1956 | Hollmann |
| 2,800,796 | A | 7/1957 | Westcott et al. |

(Continued)

FOREIGN PATENT DOCUMENTS

DE    1 282 302    11/1968
DE    40 11 901 A1    10/1991

(Continued)

OTHER PUBLICATIONS

Bal Sal Engineering Company, Inc., Santa Ana, California, BAL SAL Canted Coil Spring Gaskets, pp. 3.2-2 and 3.2-14.

(Continued)

*Primary Examiner*—Max Noori
(74) *Attorney, Agent, or Firm*—Wilmer Cutler Pickering Hale and Dorr LLP

(57) ABSTRACT

The disclosed pressure sensor includes a body, a diaphragm, and a flow defining structure. The body defines an interior volume. The diaphragm divides the interior volume into a first portion and a second portion. At least a first part of the diaphragm moves in a first direction when a pressure in the first portion increases relative to a pressure in the second portion. The first part of the diaphragm moves in a second direction when the pressure in the first portion decreases relative to the pressure in the second portion. The first part of the diaphragm and at least a first part of the body are characterized by a capacitance. The capacitance changes in response to movement of the first part of diaphragm relative to the first part of the body. The flow defining structure provides a fluid flow path from the first portion of the interior volume to a position outside of the internal volume. At least part of the fluid flow path extends from a first location to a second location. The at least part of the fluid flow path is characterized by a total length and a straight line distance. The total length is the shortest distance through the path from the first location to the second location. The straight line distance is the shortest distance between the first location and the second location. The total length is at least two times greater than the straight line distance.

25 Claims, 4 Drawing Sheets

U.S. PATENT DOCUMENTS

| | | |
|---|---|---|
| 2,907,320 A | 10/1959 | Weese et al. |
| 2,999,386 A | 9/1961 | Wolfe |
| 3,000,215 A | 9/1961 | Atanasoff et al. |
| 3,113,459 A | 12/1963 | Slater |
| 3,153,847 A | 10/1964 | Lindberg |
| 3,243,998 A | 4/1966 | Vosteen |
| 3,318,153 A | 5/1967 | Lode |
| 3,354,721 A | 11/1967 | Fiske |
| 3,371,537 A | 3/1968 | Kiene |
| 3,460,310 A | 8/1969 | Adcock et al. |
| 3,619,742 A | 11/1971 | Rud, Jr. |
| 3,620,083 A | 11/1971 | Dimeff et al. |
| 3,675,072 A | 7/1972 | Hahn et al. |
| 3,858,097 A | 12/1974 | Polye |
| 3,952,234 A | 4/1976 | Birchall |
| 3,968,695 A | 7/1976 | Weiss et al. |
| 4,008,619 A | 2/1977 | Alcaide et al. |
| 4,011,901 A | 3/1977 | Flemings et al. |
| 4,020,674 A | 5/1977 | Fechter et al. |
| 4,084,438 A | 4/1978 | Lee et al. |
| 4,084,439 A | 4/1978 | Teter et al. |
| 4,120,206 A | 10/1978 | Rud, Jr. |
| 4,136,603 A | 1/1979 | Doyle, Jr. |
| 4,141,252 A | 2/1979 | Lodge |
| 4,168,517 A | 9/1979 | Lee |
| 4,168,518 A | 9/1979 | Lee |
| 4,176,557 A | 12/1979 | Johnston |
| 4,178,621 A | 12/1979 | Simonelic et al. |
| 4,229,776 A | 10/1980 | Antikainen et al. |
| 4,302,063 A | 11/1981 | Rudy |
| 4,322,775 A | 3/1982 | Delatorre |
| 4,334,725 A | 6/1982 | Teshima et al. |
| 4,343,188 A * | 8/1982 | Baker .................... 73/706 |
| 4,357,834 A | 11/1982 | Kimura |
| 4,358,814 A | 11/1982 | Lee et al. |
| 4,389,895 A | 6/1983 | Rud, Jr. |
| 4,413,524 A | 11/1983 | Kosh |
| 4,422,125 A | 12/1983 | Antonazzi et al. |
| 4,422,335 A | 12/1983 | Ohnesorge et al. |
| 4,424,713 A | 1/1984 | Kroninger, Jr. et al. |
| 4,425,799 A | 1/1984 | Park |
| 4,426,673 A | 1/1984 | Bell et al. |
| 4,433,580 A | 2/1984 | Tward |
| 4,434,203 A | 2/1984 | Briefer |
| 4,458,537 A | 7/1984 | Bell et al. |
| 4,464,725 A | 8/1984 | Briefer |
| 4,495,820 A | 1/1985 | Shimada et al. |
| 4,499,773 A | 2/1985 | Crampton et al. |
| 4,542,436 A | 9/1985 | Carusillo |
| 4,562,742 A | 1/1986 | Bell |
| 4,567,773 A | 2/1986 | Cooper et al. |
| 4,572,204 A | 2/1986 | Stephens |
| 4,587,851 A | 5/1986 | Mortberg |
| 4,598,381 A | 7/1986 | Cucci |
| 4,603,371 A | 7/1986 | Frick |
| 4,628,403 A | 12/1986 | Kuisma |
| 4,670,733 A | 6/1987 | Bell |
| 4,679,643 A | 7/1987 | Bove |
| 4,691,574 A | 9/1987 | Delatorre |
| 4,714,464 A | 12/1987 | Newton |
| 4,730,496 A * | 3/1988 | Knecht et al. .................... 73/724 |
| 4,733,875 A | 3/1988 | Azuma et al. |
| 4,735,090 A | 4/1988 | Jeffrey et al. |
| 4,735,098 A | 4/1988 | Kavli et al. |
| 4,738,276 A | 4/1988 | Adams |
| 4,748,861 A | 6/1988 | Matsumoto et al. |
| 4,765,188 A | 8/1988 | Krechmery et al. |
| 4,769,738 A | 9/1988 | Nakamura et al. |
| 4,774,626 A | 9/1988 | Charboneau et al. |
| 4,785,669 A | 11/1988 | Benson et al. |
| 4,807,477 A | 2/1989 | Myers et al. |
| 4,815,324 A | 3/1989 | Tada et al. |
| 4,823,603 A | 4/1989 | Ferran et al. |
| 4,831,492 A | 5/1989 | Kuisma |
| 4,850,227 A | 7/1989 | Luettgen et al. |
| 4,851,015 A | 7/1989 | Wagner et al. |
| 4,875,368 A | 10/1989 | Delatorre |
| 4,881,939 A * | 11/1989 | Newman .................... 600/31 |
| 4,898,035 A | 2/1990 | Yajima et al. |
| 4,920,805 A | 5/1990 | Yajima et al. |
| 4,935,841 A | 6/1990 | Jonsson et al. |
| 4,944,187 A | 7/1990 | Frick et al. |
| 4,977,480 A | 12/1990 | Nishihara |
| 5,001,595 A | 3/1991 | Dittrich et al. |
| 5,005,421 A | 4/1991 | Hegner et al. |
| 5,020,377 A | 6/1991 | Park |
| 5,050,034 A | 9/1991 | Hegner et al. |
| 5,134,887 A | 8/1992 | Bell |
| 5,150,275 A | 9/1992 | Lee et al. |
| 5,155,653 A | 10/1992 | Kremidas |
| 5,165,281 A | 11/1992 | Bell |
| 5,186,055 A | 2/1993 | Kovacich et al. |
| 5,189,591 A | 2/1993 | Bernot |
| 5,249,469 A | 10/1993 | Johsson et al. |
| 5,257,542 A | 11/1993 | Voss |
| 5,271,277 A | 12/1993 | Pandorf |
| 5,275,055 A | 1/1994 | Zook et al. |
| 5,279,163 A | 1/1994 | D'Antonio et al. |
| 5,291,534 A | 3/1994 | Sakurai et al. |
| 5,311,140 A | 5/1994 | Permuy |
| 5,315,877 A | 5/1994 | Park et al. |
| 5,333,637 A | 8/1994 | Gravel |
| 5,343,754 A | 9/1994 | Stone |
| 5,343,755 A | 9/1994 | Huss |
| 5,348,568 A | 9/1994 | Oda et al. |
| 5,349,492 A | 9/1994 | Kimura et al. |
| 5,349,865 A | 9/1994 | Kavli et al. |
| 5,351,548 A | 10/1994 | Briggs et al. |
| 5,351,938 A | 10/1994 | Hegner et al. |
| 5,369,228 A | 11/1994 | Faust |
| 5,400,489 A | 3/1995 | Hegner et al. |
| 5,442,962 A | 8/1995 | Lee |
| 5,443,410 A | 8/1995 | Ko |
| 5,485,345 A | 1/1996 | Lukasiewicz et al. |
| 5,497,620 A | 3/1996 | Stobbe |
| 5,499,158 A | 3/1996 | Bishop et al. |
| 5,499,533 A | 3/1996 | Miller et al. |
| 5,507,080 A | 4/1996 | Hayashi et al. |
| 5,525,280 A | 6/1996 | Shukla et al. |
| 5,539,611 A | 7/1996 | Hegner et al. |
| 5,541,561 A | 7/1996 | Grunert et al. |
| 5,542,300 A | 8/1996 | Lee |
| 5,544,399 A | 8/1996 | Bishop et al. |
| 5,544,490 A | 8/1996 | Manini et al. |
| 5,561,247 A | 10/1996 | Mutoh et al. |
| 5,571,970 A | 11/1996 | Mutoh et al. |
| 5,603,684 A | 2/1997 | Wetmore et al. |
| 5,604,315 A | 2/1997 | Briefer et al. |
| 5,625,152 A | 4/1997 | Pandorf et al. |
| 5,667,758 A * | 9/1997 | Matsugi et al. ............. 422/198 |
| 5,719,740 A | 2/1998 | Hayashi et al. |
| 5,756,899 A | 5/1998 | Ugai et al. |
| 5,800,235 A | 9/1998 | Ragsdale |
| 5,808,206 A | 9/1998 | Pandorf et al. |
| 5,811,685 A | 9/1998 | Grudzien, Jr. |
| 5,836,063 A | 11/1998 | Hegner et al. |
| 5,885,682 A | 3/1999 | Tanimoto et al. |
| 5,911,162 A | 6/1999 | Denner |
| 5,916,479 A | 6/1999 | Schiabel et al. |
| 5,920,015 A | 7/1999 | Hallberg et al. |
| 5,925,824 A | 7/1999 | Soma et al. |
| 5,932,332 A | 8/1999 | Pandorf et al. |
| 5,939,639 A | 8/1999 | Lethbridge |
| 5,942,692 A * | 8/1999 | Haase et al. .................... 73/724 |

| | | | | | | |
|---|---|---|---|---|---|---|
| 5,948,169 | A | 9/1999 | Wu | JP | 5-172675 A2 | 7/1993 |
| 5,965,821 | A | 10/1999 | Grudzien | SU | 1362971 | 7/1986 |
| 6,019,002 | A * | 2/2000 | Lee .............................. 73/724 | WO | WO-99/01731 | 1/1990 |
| 6,029,524 | A | 2/2000 | Kauder et al. | WO | WO-95/06236 | 3/1995 |
| 6,029,525 | A | 2/2000 | Grudzien | WO | WO-95/28624 A1 | 10/1995 |
| 6,105,436 | A | 8/2000 | Lischer et al. | WO | WO-98/59228 | 12/1998 |
| 6,105,437 | A | 8/2000 | Klug et al. | WO | WO-99/32866 | 7/1999 |
| 6,112,597 | A | 9/2000 | Tschope | WO | WO-99/40405 | 8/1999 |
| 6,119,524 | A | 9/2000 | Kobold | WO | WO-00/43745 | 7/2000 |
| 6,122,976 | A | 9/2000 | Hallberg et al. | WO | WO-01/18516 A1 | 3/2001 |
| 6,148,674 | A | 11/2000 | Park et al. | WO | WO-01/25740 | 4/2001 |
| 6,205,861 | B1 | 3/2001 | Lee | WO | WO-02/31458 A2 | 4/2002 |
| 6,209,398 | B1 | 4/2001 | Fowler et al. | WO | WO-02/054034 A1 | 7/2002 |
| 6,315,734 | B1 | 11/2001 | Nunome | WO | WO-02/031458 A3 | 4/2003 |
| 6,340,929 | B1 | 1/2002 | Katou et al. | WO | WO-03/056289 A1 | 7/2003 |
| 6,423,949 | B1 | 7/2002 | Chen et al. | WO | WO-03/078952 A2 | 9/2003 |
| 6,443,015 | B1 | 9/2002 | Poulin et al. | WO | WO-03/089891 A1 | 10/2003 |
| 6,451,159 | B1 | 9/2002 | Lombardi et al. | | | |
| 6,516,671 | B2 | 2/2003 | Romo et al. | | | |
| 6,568,274 | B1 | 5/2003 | Lucas et al. | | | |
| 6,578,427 | B1 | 6/2003 | Hegner | | | |
| 6,581,471 | B1 | 6/2003 | Grudzien | | | |
| 6,588,280 | B1 | 7/2003 | Quigley et al. | | | |
| 6,612,176 | B2 | 9/2003 | Poulin et al. | | | |
| 6,772,640 | B1 | 9/2003 | Poulin et al. | | | |
| 6,845,664 | B1 | 1/2005 | Okojie | | | |
| 6,901,808 | B1 | 6/2005 | Sharpless et al. | | | |
| 2002/0026835 | A1 | 3/2002 | Jacob et al. | | | |
| 2003/0167852 | A1 | 9/2003 | Traverso | | | |
| 2004/0012942 | A1 | 1/2004 | Bjoerkman et al. | | | |
| 2004/0119038 | A1 * | 6/2004 | Crockett et al. ........... 251/63.5 | | | |

FOREIGN PATENT DOCUMENTS

| | | |
|---|---|---|
| DE | 41 11 118 A1 | 10/1992 |
| DE | 4 136 995 A1 | 5/1993 |
| DE | 42 07 951-A-1 | 9/1993 |
| EP | 275 844 | 7/1988 |
| EP | 0 473 109 A2 | 3/1992 |
| EP | 549 229 A2 | 6/1993 |
| FR | 895938 | 2/1945 |
| GB | 1 497 212 A | 1/1978 |
| GB | 2 044 523 | 10/1980 |
| GB | 2 162 837 | 2/1986 |
| GB | 2 188 155 | 9/1987 |
| JP | 56-162026 A2 | 12/1981 |

OTHER PUBLICATIONS

Baratron® Absolute Pressure Transmitters 400 Series, © 1996 MKS Instruments, Inc., Andover, MA.

Baraton® General Purpose Absolute Pressure Transducers, 1993 MKS Instruments, Inc.

Beynon, J.D.E., et al., "A Simple Micromanometer," 1964, J. Sci. Instruments, vol. 41(2), pp. 111-112.

Cook, D.B. et al., "A Simple Diaphragm Micromanometer," 1953, J. Scientific Instruments, vol. 30, pp. 238-239.

Derwent's Abstract 88-197466/28, week 8828, Abstract of SU, 1362971, Dec. 30, 1987.

Derwent's abstract No. 91-199892/27, week 9127, Abstract of SU, 1605145 (Mikhailov, P.G.), Nov. 7, 1990 (Accessesion No. 8695871).

Derwent's abstract No. 91-199893/27, week 9127, Abstract of SU, 1605146 (Pukhov, V.N.) Nov. 7, 1990.

English Translation from Russian of SU 1362971, Semenov et al., Method for the Evacuation of Absolute-Pressure Sensors and Device for the Carrying Out of the Method, Dec. 1987.

Instrument Specialities, Product Design & Shielding Selection Guide, Fabricated UltraFlex Gaskets, p. 108.

Patent Abstracts of Japan, Abstract of JP-59-56970, Apr. 2, 1984.

Tecknit, EMI Shield Products, "Custom strips," p. A-3.

Patent Abstracts of Japan, vol. 1997, No. 10, Oct. 31, 1997 & JP 09 159561 A (Matsushita Electric Ind. Co. Ltd), Jun. 20, 1997 abstract.

* cited by examiner

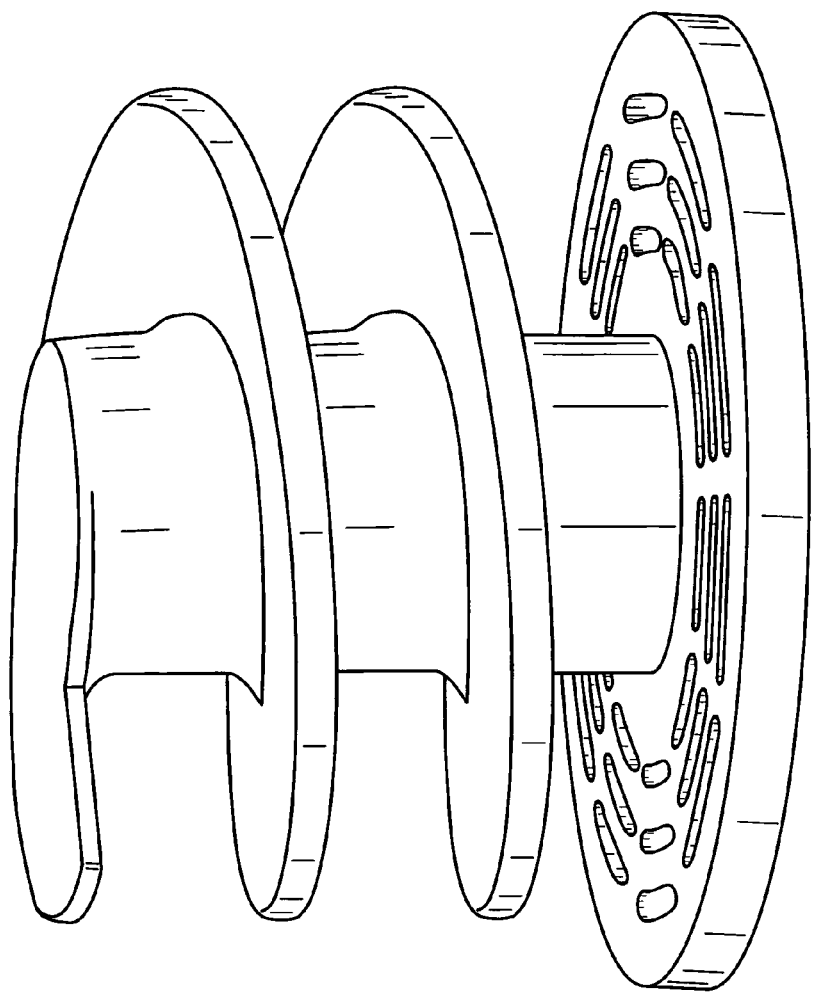
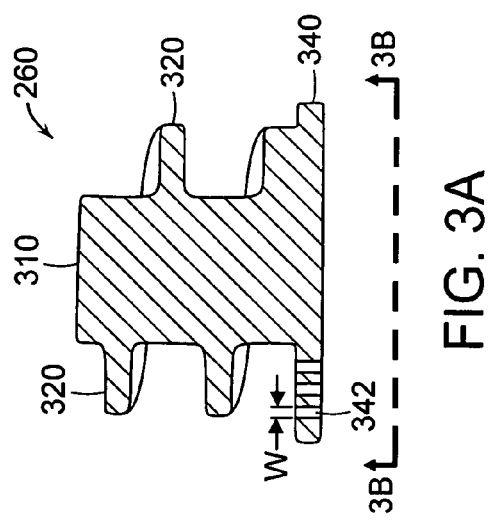
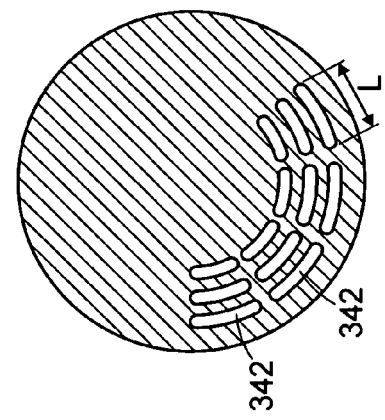

TURBO SUMP FOR USE WITH CAPACITIVE PRESSURE SENSOR

BACKGROUND OF THE INVENTION

The present invention relates to a capacitive pressure sensor. More specifically, the present invention relates to an improved filter for use with a capacitive pressure sensor.

FIG. 1A shows a sectional side view of a prior art ceramic capacitive pressure sensor 100. FIG. 1B shows an exploded view of sensor 100. Although sensors such as sensor 100 are well known, a brief description of its construction and operation will be provided. Sensor 100 includes a ceramic Pr body 102 ("Pr" representing "reference pressure"), a ceramic Px body 104 ("Px" representing "unknown pressure"), a thin, flexible ceramic diaphragm 106, and an inlet tube 108. As shown in FIG. 1A, when sensor 100 is assembled, Pr body 102 and Px body 104 are bonded together such that diaphragm 106 is clamped between the Pr and Px bodies. Diaphragm 106 may flex or deform in response to the pressure in inlet tube 108. Consequently, the pressure in tube 108 may be measured by detecting the position of diaphragm 106.

Pr body 102 and Px body 104 are shaped so that when they are bonded together, they define an interior volume. Diaphragm 106 divides this interior volume into an upper chamber 122 and a lower chamber 124 (the terms "upper" and "lower" and similar terms are used herein with reference to the drawings and do not imply any absolute orientation of the sensor). When sensor 100 is assembled, diaphragm 106 and Pr body 102 cooperatively define upper chamber 122, and diaphragm 106 and Px body 104 cooperatively define lower chamber 124. Px body 104 defines a central aperture 126. Inlet tube 108 also defines a central passageway 130, and passageway 130 is in fluid communication with the central aperture 126 of the Px body. Thus, passageway 130 is in fluid communication with the lower chamber 124.

Diaphragm 106 is a thin flexible ceramic disk onto which a conductive film 140 is deposited. Another conductive film 142 is deposited onto a central portion of Pr body 102 such that film 142 is spaced away from and opposite to the conductive film 140 on diaphragm 106. The two conductive films 140, 142 form two plates of a variable capacitor 144. As is well known, the capacitance provided by variable capacitor 144 varies with, among other things, the distance between the two plates 140, 142. Sensor 100 also includes conductive pins 150, 152. Pin 150 is electrically connected to the film 140 on diaphragm 106, and pin 152 is electrically connected to the film 142 on the Pr body 102. Pins 150 and 152 provide electrical connection to films 140 and 142, respectively, external to the body of sensor 100.

In operation, a reference pressure (e.g., vacuum) is established in the upper chamber 122 and the inlet tube is connected to a source of gas, the pressure of which is to be measured. Diaphragm 106 flexes, or deforms, in response to changes of pressure within the lower chamber, causing the capacitance provided by variable capacitor 144 to change in accordance with the pressure in inlet tube 108. Accordingly, the capacitance provided by variable capacitor 144 is indicative of the pressure within inlet tube 108.

As is well known, sensors such as sensor 100 often include additional features, which for convenience of illustration are not illustrated in FIGS. 1A and 1B. For example, such sensors often include a getter for maintaining a vacuum in the upper chamber 122. Also, such sensors often include two conductive films disposed on the Pr cover 102 instead of the single illustrated film 142. As is well known, having two such films allows the sensor to provide two variable capacitors instead of one, and this in turn can be used to improve the temperature stability of the sensor.

Pressure sensors such as sensor 100 are often used in integrated circuit fabrication foundries, for example, to measure the pressure of a fluid in a gas line that is being delivered to a deposition chamber, or to measure the pressure within the deposition chamber itself. Some of the processes used in integrated circuit fabrication, such as the etching of aluminum, tend to generate a large volume of particles or contaminants. It is generally desirable to prevent such contaminants from encountering the diaphragm 106. When such contaminants build up on diaphragm 106, the accuracy of the pressure measurement provided by sensor 100 is adversely affected. Accordingly, prior art pressure sensors have used a variety of mechanisms to prevent contaminants from reaching the diaphragm 106.

Although many such filtering mechanisms have been developed, there remains a need for improved methods and structures for preventing contaminants from reaching and settling on the diaphragm.

SUMMARY OF THE INVENTION

These and other objects are provided by an improved pressure sensor. The pressure sensor includes a body, a diaphragm, and a flow defining structure. The body defines an interior volume. The diaphragm divides the interior volume into a first portion and a second portion. At least a first part of the diaphragm moves in a first direction when a pressure in the first portion increases relative to a pressure in the second portion. The first part of the diaphragm moves in a second direction when the pressure in the first portion decreases relative to the pressure in the second portion. The first part of the diaphragm and at least a first part of the body are characterized by a capacitance. The capacitance changes in response to movement of the first part of diaphragm relative to the first part of the body. The flow defining structure defines, at least in part, a fluid flow path from the first portion of the interior volume to a position outside of the interior volume. At least part of the fluid flow path extends from a first location to a second location. The at least part of the fluid flow path is characterized by a total length and a straight line distance. The total length is the shortest distance through the path from the first location to the second location. The straight line distance is the shortest distance between the first location and the second location.

In one aspect, the total length is at least five (5.0) times greater than the straight line distance. In another aspect, the flow defining structure is non-metallic. In another aspect, the at least part of the fluid flow path is curved. In yet another aspect, the flow defining structure is a single, monolithic, structure.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE FIGURES

For a fuller understanding of the nature and objects of the present invention, reference should be made to the following detailed description taken in connection with the accompanying drawings in which the same reference numerals are used to indicate the same or similar parts wherein:

FIG. 3A shows a side view of a turbo sump constructed according to the invention.

FIG. 3B shows a view of the turbo sump taken from the direction indicated by the line 3B—3B as shown in FIG. 3A.

FIG. 3C shows a perspective view of another turbo sump constructed according to the invention.

DETAILED DESCRIPTION OF THE INVENTION

Figure 1A:
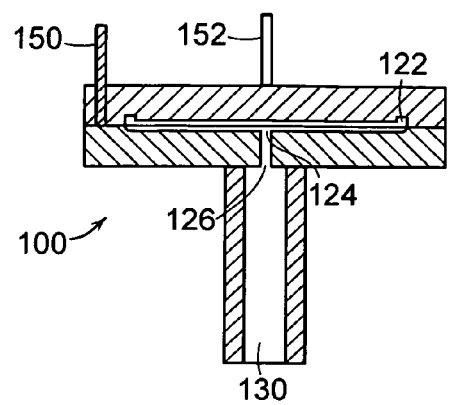
FIG. 1A shows a sectional side view of a prior art ceramic capacitive pressure sensor.
Figure 1B:
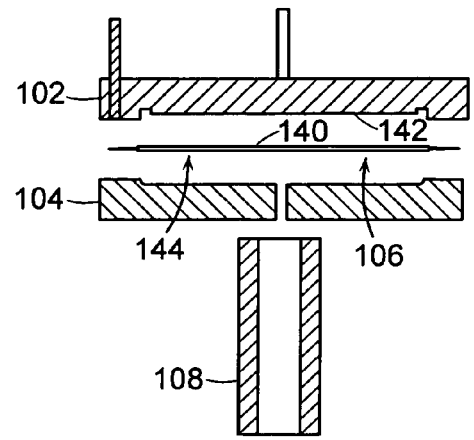
FIG. 1B shows an exploded view of the sensor shown in FIG. 1A.
Figure 2A:
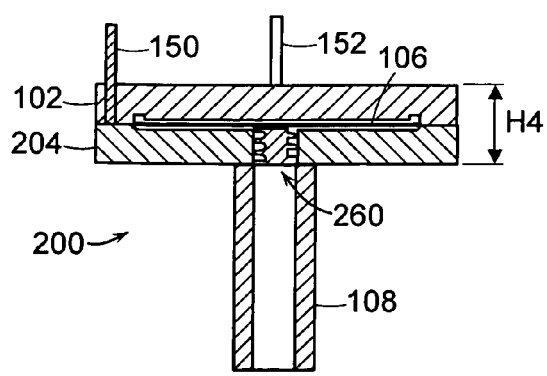
FIG. 2A shows a sectional side view of a ceramic capacitive pressure sensor constructed according to the invention.
Figure 2B:
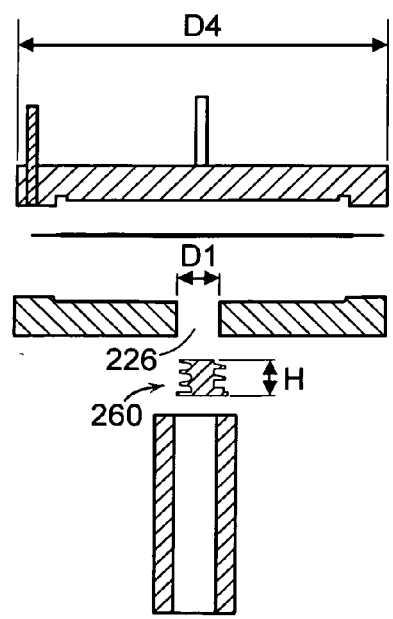
FIG. 2B shows an exploded view of the sensor shown in FIG. 2A.

FIG. 2A shows an assembled ceramic capacitive pressure sensor 200 constructed according to the invention. FIG. 2B shows an exploded view of sensor 200. Like prior art sensor 100 (FIGS. 1A and 1B), improved sensor 200 includes a Pr body 102, a diaphragm 106, an inlet tube 108, and conductive pins 150, 152. However, unlike prior art sensor 100, improved sensor 200 also includes a turbo sump 260 and a modified Px body 204. Turbo sump 260 is disposed within the central aperture 226 defined by the Px body 204.

As will be discussed in greater detail below, turbo sump 260 provides a filtering function. That is, turbo sump 260 filters particles and contaminants and reduces the amount of particles and contaminants that can reach diaphragm 106.

FIG. 3A shows a magnified view of turbo sump 260 taken from the same vantage as FIGS. 2A and 2B. FIG. 3B shows a view of turbo sump 260 taken from the direction indicated by the line 3B—3B as shown in FIG. 3A. As shown, tubo sump 260 resembles a threaded screw and includes a central post 310 and a helical thread 320. The interior portion of thread 320 is attached to the exterior curved surface of central post 310 in the same manner that threads are attached to the central portion of a screw. Turbo sump 260 also defines a disc shaped base 340. The bottom of central post 310 is attached to a central portion of base 340, and the bottom of thread 320 merges into base 340. As shown in FIGS. 3A and 3B, base 340 defines a plurality of apertures 342. Turbo sump 260 is preferably made from a single, monolithic, piece of ceramic.

Figure 4:
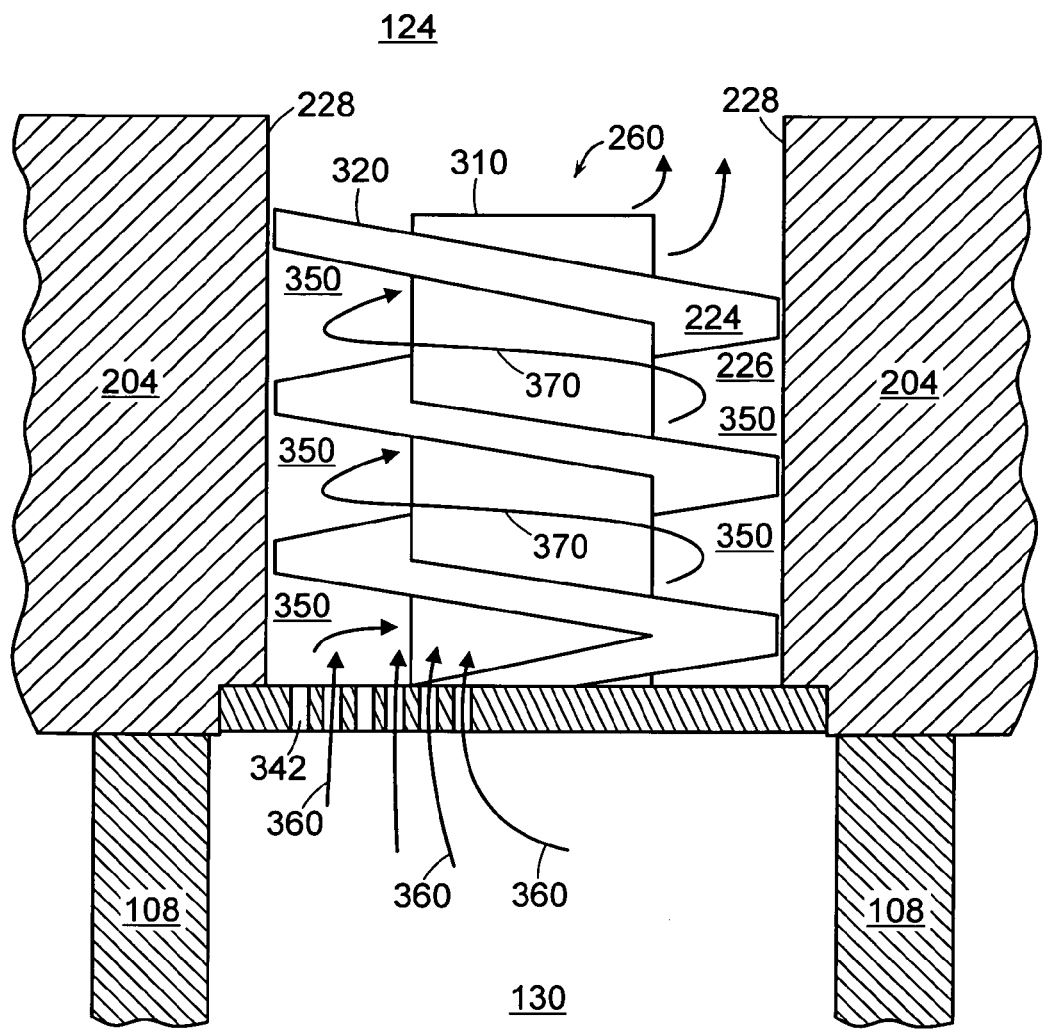
FIG. 4 shows a magnified view of a turbo sump, a portion of the Px body, and a portion of the inlet tube, of the sensor shown in FIGS. 2A and 2B.

FIG. 4 shows a magnified view of turbo sump 260 disposed in the central aperture 226 of the Px body 204 of sensor 200. As shown, central aperture 226 of Px body 204 is defined by an inner wall 228 of the Px body 204. When turbo sump 260 is installed in sensor 200, the outer edges of thread 320 fit closely to the inner wall 228, but do not make contact. The small gap G between the outer edge of thread 320 and the inner wall 228 is shown best in FIG. 4A. The solid central post 310 of turbo sump 260 occupies the central portion of aperture 226. Thus, the turbo sump 260 and the Px body 204 cooperate to define a helical channel 350 that extends from the bottom to the top of the central aperture 226. Apertures 342 in the base 340 of turbo sump 260 provide fluid communication between the channel 130 defined by inlet tube 108 and the helical channel 350. The top of helical channel 350 opens into the lower chamber 124, which is defined by the bottom of diaphragm 106 and the upper surface of the Px body 204. Thus, helical channel 350 provides fluid communication between channel 130 (defined by inlet tube 108) and the diaphragm 106. Particles or contaminants traveling from channel 130 towards diaphragm 106 pass through apertures 342 and helical channel 350 before reaching the diaphragm 106.

The apertures 342 defined by the base 340 of turbo sump 260 are configured to preclude particles of a selected size from being able to travel from channel 130 into helical channel 350. That is, apertures 342 act as a filter that prevents particles that are too big from entering channel 350. As shown in FIGS. 3A and 3B, the apertures 342 are generally elongated and are characterized by a long dimension L (FIG. 3B) and a shorter dimension W (FIG. 3A). In one preferred embodiment, the shorter dimension W is 0.010 inches, and the longer dimension L is between 0.0042 and 0.063 inches. Since most of the particles found in the gas, the pressure of which is being measured, are generally spherical, the apertures 342 filter out particles characterized by a radius greater than or equal to W. It will be appreciated that the apertures 342 may be configured in a similar manner as the apertures in the baffle shown at FIG. 4 of U.S. Pat. No. 5,811,685 (entitled FLUID PRESSURE SENSOR WITH CONTAMINANT EXCLUSION SYSTEM, and which is assigned to the assignee of the present invention).

FIG. 3B shows the apertures 342 being disposed in four groups around approximately one third of the area of base 340. That is, in the embodiment illustrated in FIG. 3B, no apertures are defined in approximately two thirds of base 340. However, as shown, for example, in FIG. 3C, in other embodiments, the apertures 342 may be distributed over the entire base 340.

Sensor 200 can be used to measure low fluid pressures (e.g., less than 0.02 Torr). When the pressure in channel 350 is below about 0.02 Torr, movement of material in channel 350 is characterized by "molecular flow". With reference to FIG. 4, in molecular flow, molecules in channel 350 generally travel in straight-line paths until colliding with a solid surface of the sensor (e.g., wall 228, a wall of thread 320, or the exterior wall of central post 310). This stands in contrast to behavior in denser gasses in which molecules are unlikely to travel in straight line paths from one surface of the sensor to another and are instead far more likely to rebound off of each other. Under molecular flow conditions, any contaminant traveling through channel 350 will likely collide with the surfaces that define channel 350 (wall 228, walls of thread 320, or a wall of central post 310) many times prior to passing through channel 350 and reaching diaphragm 106. The probability that a contaminant particle will become deposited on, or stuck to, a surface of sensor 200 rather than continuing on through channel 350 and into chamber 124 is an increasing function of the number of collisions the contaminant makes with the surfaces of sensor 200. The helical shape of channel 350 insures that contaminants passing from channel 130 towards chamber 124 will collide with the surfaces of sensor 200 (that define channel 350) many times before it can reach chamber 124. This significantly reduces the likelihood that any contaminant can actually pass through channel 350 and reach the diaphragm 106.

The path taken by a molecule passing from channel 130, through helical channel 350, to chamber 124 is shown generally in FIG. 4 by arrows 360, 370. Arrows 360 illustrate molecules traveling from channel 130 through apertures 342 into helical channel 350. Arrows 370 show the helical path generally followed by molecules traveling through helical channel 350 to chamber 124. However, it will be appreciated that arrows 370 represent only the general, or average, path taken by such molecules. Since molecules in a molecular flow regime travel in straight line paths, they require many, many straight line paths and collisions to achieve the average flow shown by curved arrow 370.

As noted above, in addition to defining helical channel 350, the sump 260 and the Px body 204 also define a small gap G (shown best in FIG. 4A) between the outer edge of thread 320 and inner wall 228. This gap G is provided to facilitate assembly of the sensor 200 (i.e., to facilitate inserting the relatively brittle ceramic sump 260 into the aperture 226 defined in the Px body 204). In theory, molecules traveling from channel 130 towards chamber 124 can follow the path through helical channel 350 (indicated generally by arrows 370) or can take "short cuts" by passing through one of the gaps G between the outer edge of thread 320 and inner wall 228. It will be appreciated however, that the small gap G between the inner wall 228 and the outer edge of the thread 320 is much smaller than channel 350. The conductance through this gap G is therefore much smaller than that of channel 350 almost eliminating particle and molecular flow through the gap G. Also, any contaminant that actually enters the gap G is likely to rebound off the surfaces of thread 320 and wall 228 many, many times while in the gap G and thereby become stuck in the gap G (i.e., become deposited on one of the surfaces defining the gap G). Accordingly, if sensor 200 is used to measure the pressure of a contaminant containing gas or fluid, the gap G will likely eventually become plugged, or sealed off, by contaminants that have become stuck in the gap G.

The gap G can be eliminated or reduced during assembly, for example, by providing a glass seal between the outer edge of thread 320 and the inner wall 228. However, the presence of gap G does not degrade the performance of sump 260 or sensor 200, and it is therefore considered unnecessary to remove the gap G.

Figure 4A:
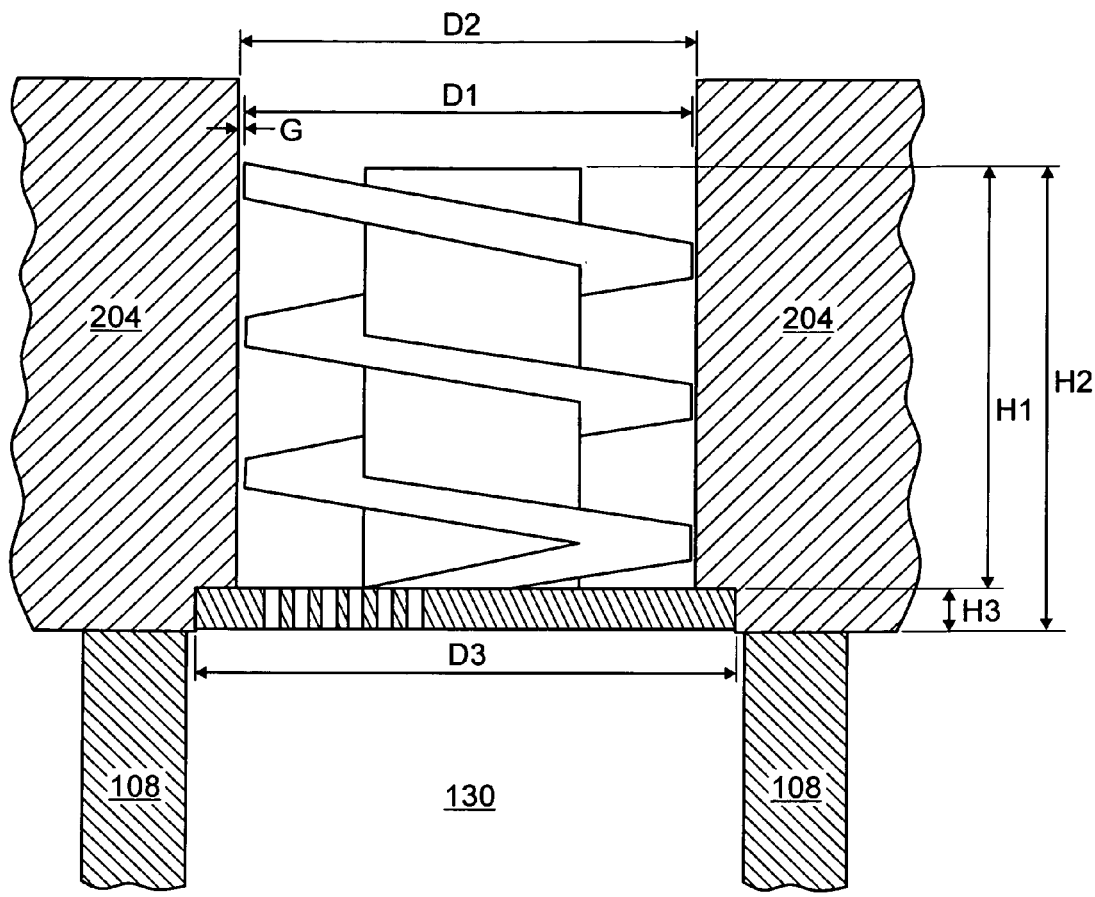
FIG. 4A shows a view of the same structure shown in FIG. 4, without reference characters and with some dimension lines.

By insuring that any contaminant must collide with the surfaces of sensor 200 many times before the contaminant can reach the diaphragm, the turbo sump 260 (and the helical channel 350 formed by sump 260) provides a function similar to that of the chamber described in U.S. Pat. No. 6,443,015 (entitled BAFFLE FOR A CAPACITIVE PRESSURE SENSOR, and which is assigned to the assignee of the present invention), which is characterized by a high aspect ratio of length to width. However, turbo sump 260 provides this function in a more compact geometry and advantageously assists in production of very small, compact, pressure sensors. Referring to FIG. 4A, in one preferred embodiment, the outer diameter D1 of the turbo sump 260 is 0.248 inches, the diameter of aperture 226 defined by Px body is 0.248 inches, and the gap G is on average 0.001 inches. In this embodiment, the outer diameter D3 of the base 340 is 0.29 inches, the height H1 of the central post 310 is 0.16 inches, the total height H2 of the sump 260 is 0.18 inches, and the height H3 of the base 340 is 0.02 inches. Also in this embodiment, the outer diameter D4 of sensor 200 (FIG. 2B) is 1.500 inches and the height H4 of sensor 200 (FIG. 2A) is 0.400 inches.

In summary, turbo sump 260 provides two distinct types of mechanical filtering. First, apertures 342 prevent particles of a certain size from entering channel 350. Second, the configuration of channel 350 prevents many of the contaminants that enter channel 350 (which are small enough to pass through apertures 342) from ever reaching the diaphragm 106.

In addition to the mechanical filtering functions described above, turbo sump 260 also provides a thermal filtering function. Sensor 200 can be used to measure the pressure of hot gasses or fluids (e.g., 200 degrees Celsius). Sensor 200 can be heated so that the sensor is at or near the temperature of the gas, the pressure of which is being measured. Heating sensor 200 can reduce the amount of condensation that forms on interior surfaces of sensor 200 and can also improve the accuracy of pressure measurements provided by sensor 200. In operation, inlet tube 108 is generally connected to a source of gas, the pressure of which is to be measured. The gas source can be, for example, a pipe, valve, or chamber. When the gas, the pressure of which is being measured, is at a high temperature, the gas source to which inlet tube 108 is connected can appear to sensor 200 as a source of thermal radiation. Turbo sump 260 blocks the line of sight path from the gas source to the diaphragm 106 and thereby provides a filter for thermal radiation. That is, turbo sump 260 prevents thermal radiation emitted from the gas source from being directly incident on the diaphragm 206.

Turbo sump 260 has been described within the context of a ceramic capacitive pressure sensor. However, it will be appreciated that turbo sump 260 can be used in other types of sensors as well. For example, turbo sump 260 can be made of metal and used in metallic sensors. It will be appreciated that, since metal is less brittle than ceramic, in such sensors it is relatively easier to eliminate or reduce the gap G between the outer edge of the thread and the inner wall of the aperture 226. For example, in such sensors the outer diameters of the sump can be made slightly larger than the diameter of the aperture within which the sump fits, and the (larger) sump can be press fit into the (smaller) aperture.

Figure 5:
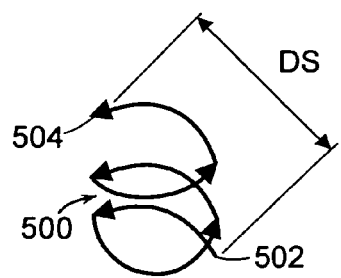
FIG. 5 shows an abstracted view of a helical channel formed by a sensor constructed according to the invention.
Figure 6:
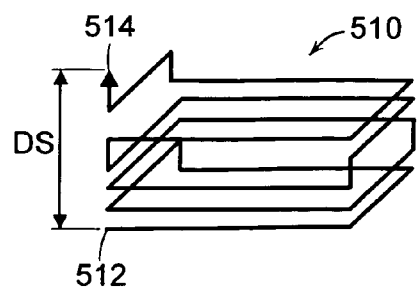
FIG. 6 shows an abstracted view of a non-helical channel formed by a sensor constructed according to the invention.

Also, turbo sump 260 has been described as having a helical thread 320 (which in turn creates a helical channel 350). However, it will be appreciated that neither the thread 320 nor the channel 350 must be perfectly helical. As long as the channel 350 formed by the turbo sump and the Px body is circuitous or serpentine, the sump will provide the desired contaminant filtering function (by insuring that a contaminant must contact surfaces of the sensor many times before the contaminant can reach the diaphragm, at least when the pressure within the channel is low enough to provide for molecular flow). FIG. 5 shows an abstracted view of a helical channel 500. Channel 500 has an inlet 502 and an outlet 504. It will be appreciated that channel 500 as shown in FIG. 5 is an abstracted representation of the channel 350 (shown, e.g., in FIG. 4). That is, inlet 502 corresponds to apertures 342 and outlet 504 corresponds to the junction of channel 350 and the chamber 124. FIG. 6 shows an abstracted view of another circuitous channel 510, that has an inlet 512 and an outlet 514. Channel 510 is not helical, but it is circuitous, or serpentine. A sump constructed according to the invention could provide a channel shaped as shown in FIG. 6 instead of a helical channel. Although channels 500 and 510 look quite different, they share some important common features. Neither channel provides a straight line path from the inlet to the outlet. Rather, any particle traveling through either channel 500 or 510, will change direction several times before it can travel from the inlet to the outlet. Both channels 500, 510 are characterized by a total length LT (i.e., the length that extends through the channel from the inlet to the outlet) and a straight line distance DS between the inlet and the outlet. In both channels, the total length length LT of the channel is significantly larger than the straight line distance DS.

Although sensors using channels 500 or 510, or other circuitous channels, may be constructed according to the invention, the helical channels 500, or 350, may be optimal. This is because in any channel that has no straight portions and is instead constantly curving (such as in a helical channel), there is no significant portion of the length of the channel that can be traversed by a single straight line path. On the other hand, channels such as channel 510 do include sections that could be traversed by a single straight line path. For example, channel 510 could, at least in theory, be traversed by a molecule in a molecular flow regime that made only about twenty collisions (i.e., one collision for every right angle in the channel). On the other hand, many more collisions would be required for a molecule, flowing in a molecular flow regime, to traverse a constantly curving channel of similar total length. Also, of all the constantly curving channels, a helical channel is the most geometrically compact for any given total length. Accordingly, helical shaped channels may be optimal.

In channels constructed according to the invention, the total length of the channel LT is preferably at least two (2.0) times longer than the straight line distance DS between the inlet and the outlet. It is more preferable for the total length of the channel LT to be at least five (5.0) times longer than the straight line distance DS between the inlet and the outlet. It is more preferable for the total length of the channel LT to be about six (6.0) times longer than the straight line distance DS between the inlet and the outlet. Also, the channels are preferably characterized by a circuitous, or serpentine path from the inlet to the outlet. In the embodiment of turbo sump 260 for which dimensions D1–D3 and H1–H3 were provided above (in connection with FIG. 4A), the shortest total length of the channel LT (i.e., a path that winds tightly around the central post 310) is about 1.2 inches, whereas the total height H2 of the sump (which is close to the straight line distance DS) is 0.18 inches.

Turbo sump 260 has been described as having a single thread 320. It will be appreciated that turbo sump 260 can alternatively be built with several threads instead of just a single thread as has been described. In such embodiments, the sensor defines a plurality of circuitous, or serpentine, channels instead of a single such channel. Also, the sump may be provided with obstacles (e.g., "fins") that extend from the thread and further occlude channel 350 thereby further increasing the likelihood that contaminants will not reach the diaphragm. Such obstacles preferably do not substantially lower the conductance of the channel 350. Also, turbo sump 260 has been described as being disposed within an aperture defined in the body of the sensor. Alternatively, the sump can be disposed within the inlet tube.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A pressure sensor, comprising:
   a body defining an interior volume, the body including a wall defining an aperture;
   a flexible diaphragm dividing the interior volume into a first portion and a second portion, the aperture being disposed so that particles outside the interior volume must travel through the aperture to reach the diaphragm, at least a first part of the diaphragm moving in a first direction when a pressure in the first portion increases relative to a pressure in the second portion, the first part of the diaphragm moving in a second direction when the pressure in the first portion decreases relative to the pressure in the second portion, the first part of the diaphragm and at least a first part of the body being characterized by a capacitance, the capacitance changing in response to movement of the first part of the diaphragm relative to the first part of the body;
   a flow defining structure, the structure being formed from ceramic and having a first structural portion disposed within the aperture, the first structural portion being spaced away from the wall, the structure defining, at least in part, a fluid flow path from the first portion of the interior volume to a position external to the interior volume, at least part of the fluid flow path extending from a first location to a second location, the at least part of the fluid flow path being characterized by a total length and a straight line distance, the total length being the shortest distance through the path from the first location to the second location, the straight line distance being the shortest distance between the first location and the second location, the total length being at least five times greater than the straight line distance.

2. A sensor according to claim 1, the flow defining structure including a central post and at least one substantially helical thread disposed around the central post.

3. A sensor according to claim 2, the flow defining structure further including a base, the base defining a plurality of apertures.

4. A sensor according to claim 1, the at least part of the fluid flow path being substantially helical.

5. A sensor according to claim 1, further including an inlet tube, the inlet tube defining an interior channel, the interior channel being in fluid communication with the fluid flow path.

6. A sensor according to claim 1, the body comprising a ceramic material, the diaphragm including a ceramic diaphragm portion and a metallic diaphragm portion.

7. A sensor according to claim 1, the first part of the body comprising a metallic film.

8. A sensor according to claim 1, the body comprising a ceramic material.

9. A sensor according to claim 1, the at least part of the fluid flow path including a fluid flow path portion characterized by a smooth curve.

10. A pressure sensor, comprising:
    a body, the body including a first ceramic portion and a second ceramic portion, a first metallic film being disposed on part of the first ceramic portion of the body, the second ceramic portion of the body including a wall defining an aperture;
    a diaphragm, the diaphragm including a ceramic diaphragm portion and a metallic film disposed on the ceramic diaphragm portion, the diaphragm being disposed between the first ceramic portion of the body and the second ceramic portion of the body, the diaphragm and the first ceramic portion of the body defining a first chamber, the diaphragm and the second ceramic portion of the body defining a second chamber, at least a first part of the diaphragm moving in a first direction when a pressure in the first chamber increases relative to a pressure in the second chamber, the first part of the diaphragm moving in a second direction when the pressure in the first chamber decreases relative to the pressure in the second chamber, the first part of the diaphragm and the first metallic film being characterized by a capacitance, the capacitance changing in response to movement of the first part of the diaphragm relative to the first metallic film;

an inlet tube, a first end of the inlet tube being connected to the second ceramic portion of the body, a second end of the inlet tube being configured for coupling to a source of fluid, the inlet tube defining an interior channel extending from the second end to the first end, the interior channel being in fluid communication with the aperture defined by the second ceramic portion of the body;

a ceramic flow defining structure disposed in the aperture defined by the second ceramic portion of the body, the flow defining structure including a base, a post, and a thread, the thread being disposed around the post and the thread being spaced away from the wall, the flow defining structure and the second ceramic portion of the body defining a substantially helical channel, the helical channel being configured such that at least some of the fluid traveling from the interior channel to the diaphragm passes through the substantially helical channel before reaching the diaphragm, the base separating the substantially helical channel from the interior channel, the base defining a plurality of apertures, the apertures providing fluid communication between the substantially helical channel and the interior channel.

11. A pressure sensor, comprising:

a body defining an interior volume, the body including a wall defining an aperture;

a flexible diaphragm dividing the interior volume into a first portion and a second portion, the aperture being disposed so that particles outside the interior volume must travel through the aperture to reach the diaphragm, at least a first part of the diaphragm moving in a first direction when a pressure in the first portion increases relative to a pressure in the second portion, the first part of the diaphragm moving in a second direction when the pressure in the first portion decreases relative to the pressure in the second portion, the first part of the diaphragm and at least a first part of the body being characterized by a capacitance, the capacitance changing in response to movement of the first part of the diaphragm relative to the first part of the body;

a flow defining structure, the structure being formed from ceramic and having a first structural portion disposed within the aperture, the first structural portion being spaced away from the wall, the structure defining, at least in part, at least a first fluid flow path and a second fluid flow path, the first and second fluid flow paths extending from the first portion of the interior volume to a position outside of the interior volume, at least part of the first and second fluid flow paths extending from a first location to a second location, the at least part of the first fluid flow path being characterized by a total length and a straight line distance, the total length being the shortest distance through the first fluid flow path from the first location to the second location, the straight line distance being the shortest distance between the first location and the second location, the total length being at least five times greater than the straight line distance, the first fluid flow path having a higher conductance than the second fluid flow path.

12. A sensor according to claim 11, the flow defining structure including a central post and at least one substantially helical thread disposed around the central post.

13. A sensor according to claim 12, the flow defining structure further including a base, the base defining a plurality of apertures.

14. A sensor according to claim 11, the at least part of the first fluid flow path being substantially helical.

15. A sensor according to claim 11, further including an inlet tube, defining an interior channel, the interior channel being in fluid communication with the first and second fluid flow paths.

16. A sensor according to claim 11, the body comprising a ceramic material, the diaphragm including a ceramic diaphragm portion and a metallic diaphragm portion.

17. A sensor according to claim 11, the first part of the body comprising a metallic film.

18. A sensor according to claim 11, the body comprising a ceramic material.

19. A sensor according to claim 11, the at least part of the fluid flow path including a fluid flow path portion characterized by a smooth curve.

20. A pressure sensor, comprising a body defining an interior volume, the body including a wall defining an aperture;

a flexible diaphragm dividing the interior volume into a first portion and a second portion, the aperture being disposed so that particles outside the interior volume must travel through the aperture to reach the diaphragm, at least a first part of the diaphragm moving in a first direction when a pressure in the first portion increases relative to a pressure in the second portion, the first part of the diaphragm moving in a second direction when the pressure in the first portion decreases relative to the pressure in the second portion, the first part of the diaphragm and at least a first part of the body being characterized by a capacitance, the capacitance changing in response to movement of the first part of the diaphragm relative to the first part of the body;

a flow defining structure, the structure being formed from ceramic and having a first structural portion disposed within the aperture, the first structural portion being spaced away from the wall, the structure defining, at least in part, a fluid flow path from the first portion of the interior volume to a position external to the interior volume, at least part of the fluid flow path extending from a first location to a second location, the at least part of the fluid flow path being curved and being characterized by a total length and a straight line distance, the total length being the shortest distance through the path from the first location to the second location, the straight line distance being the shortest distance between the first location and the second location, the total length being at least two times greater than the straight line distance.

21. A sensor according to claim 2, the flow defining structure further including a plurality of obstacles extending from the helical thread into at least a portion of the fluid flow path.

22. A sensor according to claim 10, the flow defining structure further including a plurality of obstacles extending from the thread into at least a portion of the helical channel.

23. A sensor according to claim 11, the flow defining structure further including a plurality of obstacles extending from the helical thread into at least a portion of the fluid flow path.

24. A sensor according to claim 20, the flow defining structure further including a plurality of obstacles extending into at least a portion of the fluid flow path.

25. A sensor according to claim 3, the body further including a second wall defining a second aperture adjacent to the first aperture, the second aperture being larger than the first aperture, and the base being disposed in the second aperture.

* * * * *